(12) United States Patent
Atarashi et al.

(10) Patent No.: US 6,310,118 B1
(45) Date of Patent: Oct. 30, 2001

(54) COLORING MATERIAL COMPOSITION

(75) Inventors: Takafumi Atarashi, Tokyo; Katsuto Nakatsuka, 3-5-1403, Moniwadai 4-chome, Taihaku-ku, Sendai, Miyagi, both of (JP)

(73) Assignees: Nittetsu Mining Co., Tokyo; Katsuto Nakatsuka, Miyagi, both of (JP)

( * ) Notice: Subject to any disclaimer, the term of this patent is extended or adjusted under 35 U.S.C. 154(b) by 0 days.

(21) Appl. No.: 09/242,470

(22) PCT Filed: Aug. 20, 1997

(86) PCT No.: PCT/JP97/02096

§ 371 Date: Feb. 18, 1999

§ 102(e) Date: Feb. 18, 1999

(87) PCT Pub. No.: WO98/07792

PCT Pub. Date: Feb. 26, 1998

(30) Foreign Application Priority Data

Aug. 22, 1996 (JP) .................................................. 8-221498
Dec. 16, 1996 (JP) .................................................. 8-335787

(51) Int. Cl.$^7$ ...................................................... C08K 9/00
(52) U.S. Cl. .......................... 523/205; 523/206; 523/209; 523/216
(58) Field of Search ................................... 523/205, 206, 523/209, 216

(56) References Cited

U.S. PATENT DOCUMENTS 5,607,504 * 3/1997 Schmid et al. ....................... 106/403
5,763,085   6/1998 Atarashi ............................... 428/403
5,958,125 * 9/1999 Schmid et al. ....................... 106/417

FOREIGN PATENT DOCUMENTS

| 6-88041 | 3/1994 | (JP) | ................... C09D/5/00 |
| 6-93206 | 4/1994 | (JP) | ................... C09C/3/06 |
| 7-331109 | 12/1995 | (JP) | ................... C09C/3/06 |
| 8-209024 | 8/1996 | (JP) | ................... C09C/1/62 |

OTHER PUBLICATIONS

International Search Report.

* cited by examiner

*Primary Examiner*—Edward J. Cain
(74) *Attorney, Agent, or Firm*—Sughrue, Mion, Zinn Macpeak & Seas, PLLC

(57) ABSTRACT

A colorant composition capable of giving a coating film excellent in heat resistance and weather resistance which not only can have a single clear color, such as, blue, green, yellow, or the like, and be used for forgery prevention based on discrimination by means other than visible light rays, but also does not suffer color fading even at a high temperature of 350° C. to 600° C. The colorant composition comprises at least a powder comprising a base particle coated with a multilayered film comprising layers differing from each other in refractive index to make the base particle have an interference color, wherein the powder is dispersed in a dispersion medium.

13 Claims, 3 Drawing Sheets

380  VISIBLE LIGHT REGION  780

↓ INDICATES PEAK POSITION

380  VISIBLE LIGHT REGION  780

↓ INDICATES PEAK POSITION

COLORING MATERIAL COMPOSITION

TECHNICAL FIELD

The present invention relates to a colorant composition. More particularly, this invention relates to a heat-resistant colorant composition which is useful as an ink for color printing or holography and gives a coating film withstanding a high temperature, specifically, a colorant composition which combines heat resistance, weather resistance, and light resistance and can give a coating film withstanding a high temperature of 350° C. to 600° C. and having sufficient weather resistance and light resistance.

Furthermore, this invention relates to a colorant composition which is also applicable to a high-performance ink for magnetic color printing and is capable of heightening the effect of print forgery prevention.

BACKGROUND ART

A technique of coating a powder with another substance in order to use the powder in various applications is known. With progress in various technical fields, there is a growing desire for a powder having unique properties, especially a metal or metal compound powder. Namely, there is a desire for a powder which combines properties inherent only in a powder, especially a metal or metal compound powder, with other properties so as to have a combination of functions.

For example, in the case of a magnetic metal powder for use as a material for a magnetic color toner, the magnetic powder cannot be used if the color thereof remains as it is, although this does not arouse a problem in conventional black magnetic toners. Any conventionally known coated powder obtained by forming a thin metal oxide film on the surface of a powder for the purpose of surface modification so as to, e.g., protect the powder or facilitate mixing of the powder with, e.g., a synthetic resin does not satisfy the new requirements in such a field. From this standpoint, it is necessary to provide a powder having a novel constitution not seen in any conventional powder.

The present inventors previously invented a powder comprising a base powder particle of either a metal or a metal compound and having thereon a metal oxide film having an even thickness of 0.01 to 20 μm and in which the metal contained therein differs in kind from the metal constituting the base powder particle, in order to provide a powder which combines properties inherent only in the metal particle or metal compound particle with other properties so as to have a combination of functions (JP-A-6-228604). The present inventors further improved the above powder and invented also a powder comprising a base particle having not only a metal oxide film alone but also plural layers of a metal oxide film and a metal film alternately (JP-A-7-90310). Furthermore, the present inventors filed a patent application relating to a process which comprises similarly forming a multilayered metal oxide film on the surface of a metal or metal compound powder and subjecting the powder coated with the multilayered metal oxide film to a heat treatment to produce a powder having a denser and stabler, multilayered metal oxide film (Japanese Patent Application No. 7-80832).

For producing these powders, it is necessary to form two or more metal oxide films each having an even thickness on a base powder particle. Since it is difficult to precipitate either a metal oxide or a metal compound serving as a precursor thereof from an aqueous metal salt solution in forming such a multilayered film, the present inventors developed a method for forming a metal oxide film on a base particle of the powder by dispersing the base particles into a metal alkoxide solution and hydrolyzing the metal alkoxide. Due to this method, it has become possible to form a metal oxide film which is thin and even in thickness and, in particular, it has become possible to form a multilayered metal oxide film.

On the other hand, in the case where a coating material is used for forming a coating film to be used in a high-temperature place, the coating material used is a heat-resistant coating material which withstands the temperature. Also, even when colorant compositions (ink/coating compositions) developed for use in applications where heat resistance or weather resistance is required are used, the coating films obtained by applying the colorant compositions generally have a low heat resistance temperature. This is attributable to the fact that the colorant compositions employ pigments which have low thermal stability at a high temperature. For example, organic pigments suffer discoloration or oxidation/combustion at a temperature not lower than 300° C. Even inorganic pigments, which have relatively high thermal stability, are apt to suffer thermal denaturation and frequently react with additives or adhesive substances to undergo discoloration or color fading. Moreover, long-term exposure to sunlight frequently results in color fading.

A colorant composition generally comprises an inorganic or organic pigment dispersed in a solvent containing dissolved therein a medium (dispersion medium) serving as a film-forming agent. However, none of the prior art pigmented coating materials contains a pigment which itself has a stable color tone at a temperature not lower than 350° C.

In heat-resistant colorant compositions, media (dispersion media) for heat-resistant coating materials have conventionally been thought to be classified by use temperature as follows: organic media and silicone-modified organic media are usable at a temperature up to about 165° C.; silicone-modified aluminum media or silicone media are usable with thermally stable coloring pigments at a temperature up to about 316° C.; silicone media and aluminum pigments are usable or silicone media and black/gray pigments are usable at a temperature up to about 424° C.; silicone media and aluminum pigments are usable at a temperature up to about 538° C.; and silicone-modified aluminum media are usable at a temperature up to about 650° C. It is further thought that at a temperature not lower than 650° C., none of such heat-resistant media is usable and ceramic coating is the only usable technique.

In the case where the film-coated powders described above are to be applied to color printing inks or the like, the powders should be colored. However, since the pigment itself suffers pulverization in a mechanochemical method and comes to have a reduced particle diameter and a lighter color, coloring with a dye or the like is necessary. This applies also to magnetic inks; since the magnetic material has a dull color, a coloring pigment or a white vehicle is added in an exceedingly large amount in order to eliminate the color, resulting in reduced magnetic properties.

In the case of color printing or magnetic color printing for producing gift checks, the demand for which is increasing recently, or producing concert tickets and the like, there are desires not only for elegant coloring and suitability for visual or magnetic reading but also for a special function for forgery prevention.

Furthermore, in production facilities used over long in a high-temperature state, such as high-temperature heat treatment apparatuses, high-temperature reactors, high-temperature dissolvers, and the like, and in general facilities and the like used over long in a high-temperature state, such as high-temperature heaters, cooking utensils, and the like, there frequently is the necessity of coating those parts of such apparatuses and tools which are to be exposed to a high temperature for the purpose of protecting the apparatuses and tools against oxidation or enabling these to retain a beautiful appearance. There is hence a desire for a coating material which does not suffer discoloration/color fading even when exposed to a high temperature over long. In addition, a weather-resistant and light-resistant coating material is desired for the coating of facilities and tools to be used outdoors over long.

Accordingly, an object of the present invention is to eliminate these problems and provide a colorant composition which not only can be used as a color ink of a single, clear, stable color tone, such as blue, green, yellow, or the like, even without incorporation of a dye or pigment thereinto, but also functions to enhance a print forgery preventive performance based on a new technique other than visual examination or magnetic reading when used in combination with a reader. Another object of the present invention is to provide a colorant composition which not only has such excellent functions but also can exhibit an excellent magnetic performance also in magnetic color printing.

Still another object of the present invention is to provide a colorant composition capable of giving a coating film excellent in heat resistance and weather resistance which does not suffer color fading even at a high temperature of 350° C. to 600° C.

DISCLOSURE OF THE INVENTION

The present inventors made intensive studies. As a result, they have found that an ink having a clear stable color tone, such as blue, green, yellow, or the like, can be obtained without using a dye or pigment by forming a thin film composed of two or more layers differing in refractive index on the surface of a powder to regulate the multilayered film with respect to reflected-light interference waveform, and that this ink is effective in forgery prevention based on print discrimination with an invisible light.

It has also been found that powders having various properties, such as ferroelectric materials, conductive materials, and the like, can be utilized as the above powder, and that even when a magnetic material is used alone, it can be colored in a bright tint without impairing the magnetic properties thereof.

Furthermore, in the multilayer-coated powder invented by the present inventors, since the substances constituting the metal oxide films or metal films constituting the multilayered coating film serving as a light interference film are stable to heat, this multilayered coating film serving as a light interference film is stable to heat. The present inventors hence came to have a concept that a colorant composition (ink/coating composition) for heat-resistant applications might be obtained when the multilayer-coated powder described above was used. They pursued investigations based on that idea and, as a result, have completed the present invention.

Specifically, the present invention can accomplish the above-described objects by the following means.

(1) A colorant composition comprising at least a powder comprising a base particle coated with a multilayered film comprising layers differing from each other in refractive index to make the base particle have an interference color, wherein the powder is dispersed in a dispersion medium.
(2) The colorant composition as described in the above (1), wherein the base particle of the powder is a magnetic material.
(3) The colorant composition as described in the above (1), wherein the base particle of the powder is a dielectric material.
(4) The colorant composition as described in the above (1), wherein the base particle of the powder is a conductive material.
(5) The colorant composition as described in the above (1), wherein the base particle of the powder is made of a material which suffers neither deformation nor discoloration at a high temperature of 350° C. to 600° C.
(6) The colorant composition as described in the above (1) wherein at least one layer of the multilayered film of the powder is a metal compound layer.
(7) The colorant composition as described in the above (1), wherein at least one layer of the multilayered film of the powder is a metal layer or an alloy layer.
(8) The colorant composition as described in the above (1), wherein the powder has at least one specific interference reflection peak outside the visible light region besides in the visible light region.
(9) The colorant composition as described in the above (1), wherein the dispersion medium comprises at least one resin and a solvent.
(10) The colorant composition as described in (9), wherein the resin is at least one heat-resistant resin.
(11) The colorant composition as described in (10), wherein the heat-resistant resin is at least one selected from a pure silicone resin, a fluororesin, and a silicone-modified resin.
(12) A color ink composition comprising the colorant composition as described in the above (1).
(13) A heat-resistant colorant composition comprising the colorant composition as described in the above (1).

In the present invention, light-interference coating layers made of two or more metal compounds or metals differing in refractive index are superposed on the surface of base powder particle. In this superposition, the function of reflecting or absorbing incident light in a specific wavelength range can be imparted by regulating the thickness of each film or varying the order of superposition or layer combination Thus, the base particle can be colored in a single clear tint, such as blue, green, yellow, or the like, and can be made to have one or more specific interference reflection peaks outside the visible light region besides in the visible light region. In addition, the thus-colored powder undergoes no color change as long as the shape of the base particle of the powder or the refractive index or thickness of each layer of the multilayered film does not change considerably with changing temperature. Since the refractive index and thickness of each layer change only slight, the color remains unchanged up to a high temperature. Consequently, a stable color is maintained at a high temperature of 350° C. to 600° C.

Furthermore, even upon long-term exposure to sunlight, the powder of the present invention suffers no color change because the shape of the base particle of the powder and the refractive index and thickness of each layer of the multilayered film do not change upon the exposure.

The powder therefore has an excellent advantage that in the case where the retention of heat resistance is especially required, this can be attained by merely using a base particle made of a metal oxide or elemental metal which each generally has high thermal stability, and there is no need of using a color substance (dye or organic pigment) having low thermal or chemical stability.

The present invention will be explained below in detail.

The base particle of the multilayer-coated powder for use in the present invention is not particularly limited, and powders having various properties, such as magnetic, ferroelectric, conductive properties, and the like, can be used. Although the base in this case has a specific gravity of 0.1 to 10.5, the specific gravity thereof is preferably 0.1 to 5.5, more preferably 0.1 to 2.8, from the standpoint of flowability and suspensibility in a dispersion medium. Specific gravities of the base smaller than 0.1 are uneconomical in that the buoyancy of the base in a dispersion medium is so high that a film composed of a larger number of layers or having an exceedingly large thickness should be formed. On the other hand, specific gravities thereof exceeding 10.5 are unsuitable in that a film for suspending the base in a dispersion medium should be formed thickly.

Materials of various kinds can be used, such as metals, metal compounds, organic substances, inorganic substances, and the like.

The metals may be any metals, such as iron, nickel, chromium, titanium, aluminum, and the like. However, in producing a powder whose magnetic properties are to be utilized, a metal capable of retaining magnetic properties, e.g., iron, is preferred. These metals may be alloys. In the case where the magnetic powder is to be produced, it is preferred to use a ferromagnetic alloy. Typical metal compounds include oxides of the aforementioned metals. Although examples thereof include oxides of iron, nickel, chromium, titanium, aluminum, and silicon, the metal compounds may also be oxides of calcium, magnesium, barium, and the like, or may be composite oxides thereof. Furthermore, examples of metal compounds other than metal oxides include metal nitrides, metal carbides, metal sulfides, metal fluorides, metal carbonates, and metal phosphates. Specifically, iron nitride and the like are preferred.

The organic substances are preferably resin particles. Examples thereof include cellulose powders, cellulose acetate powders, polyamides, epoxy resins, polyesters, melamine resins, polyurethanes, vinyl acetate resins, silicone resins, and spherical or pulverized particles obtained through the polymerization or copolymerization of acrylic esters, methacrylic esters, styrene, ethylene, propylene, and derivatives thereof. Especially preferred resin particles are spherical acrylic resin particles obtained by the polymerization of an acrylic or methacrylic ester.

Usable as the inorganic substances are inorganic hollow particles, such as Shirasu balloons (hollow silicic acid particles) and the like, fine hollow carbon spheres (Kureca Sphere), fused alumina bubbles, aerosil, white carbon, fine hollow silica spheres, fine hollow calcium carbonate spheres, calcium carbonate, pearlite, talc, bentonite, micas, such as synthetic micas, commonmica, and the like, kaolin, and the like.

The material for use as the base to be coated with a multilayered film is preferably a metal, especially preferably iron or an iron-based alloy, for example, for use in applications, such as automotive coating, steel can printing, and the like. Likewise in the case of printing on aluminum products, such as aluminum cans and the like, it is especially preferred to use aluminum as the base. This is because the multilayered film and the base are thought to be more effective in hiding the color of the article to be coated or printed, when the article is made of the same material as the base.

Examples of the shape of the base powder particle include isotropic shapes, such as sphere, nearly spherical shapes, regular polyhedrons, and the like, and polyhedrons, such as rectangular parallelepipeds, spheroids, rhombohedrons, plates, acicular shapes (cylinders and prisms), and the like. Also usable are powders of completely irregular shapes, such as pulverized particles and the like.

In the present invention, the base powder particle constituting the core of the powder may be an organic substance or an inorganic substance as described above. However, especially in the case where the powder is required not to suffer deformation or discoloration at a high temperature of 350° C. to 600° C., inorganic substances are preferred, and a very limited number of organic substances are usable.

The apparent specific gravity of the base powder particle in this case is not particularly limited. For a colorant (coating material) having a low viscosity, it is preferred to use a base powder particle having a small apparent specific gravity close to that of the organic solvent serving as a dispersion medium so as to impart satisfactory dispersion stability to the powder to be dispersed into the dispersion medium.

In the case of using a base particle which suffer neither deformation nor discoloration at a high temperature, examples of the inorganic substance constituting the base particle include metals, such as iron, nickel, chromium, titanium, aluminum, and the like, metal alloys, such as iron-nickel and iron-cobalt alloys, iron-nickel alloy nitrides, iron-nickel-cobalt alloy nitrides, and the like, and further include various inorganic compounds, examples of which include metal oxides, such as oxides of iron, nickel, chromium, titanium, aluminum, silicon (in this case, silicon is classified in metals), and the like, oxides of alkaline earth metals, such as calcium, magnesium, barium, and the like, composite oxides thereof, clays, and glasses. Examples of base powder particle having an especially small apparent specific gravity include inorganic hollow particles, such as Shirasu balloons (hollow silicic acid particles), fine hollow carbon spheres (Kureca Sphere), fine hollow silica spheres, fine hollow calcium carbonate spheres, and the like.

Although the base particle which suffers neither deformation nor discoloration at a high temperature can be made of an organic substance, many natural and synthetic polymeric compounds are unusable because they deform or oxidatively discolor upon exposure to a high temperature not lower than 350° C. (not higher than 600° C.). However, polymers suitable for the use can be found from crosslinked, heat-resistant condensation polymer compounds, e.g., polyamide resins, polyimide resins, epoxy resins, and melamine resins.

In the present invention, the base powder particle is coated with two or more coating layers which differ from each other in refractive index and which each has a suitably selected refractive index and a suitably selected thickness, whereby a powder is obtained which has an interference color and has one or more specific interference reflection peaks outside the visible light region besides in the visible light region.

The material for constituting each coating layer is preferably selected freely from inorganic metal compounds, metals or alloys, and organic substances.

Typical examples of the inorganic metal compounds which may constitute the coating layers include metal oxides. Specific examples thereof include oxides of iron, nickel, chromium, titanium, aluminum, silicon, calcium, magnesium, and barium and composite oxides thereof, such as barium titanate, lead titanate, and the like. Examples of the metal compounds other than metal oxides include metal fluorides, such as magnesium fluoride, calcium fluoride and the like, metal nitrides such as iron nitride and the like, metal sulfides such as zinc sulfide, cadmium sulfide and the like, metal carbonates, such as calcium carbonate and the like, metal phosphates, such as calcium phosphate and the like, and metal carbides.

Examples of the elemental metals which may constitute the coating layers include silver metal, cobalt metal, nickel metal, and iron metal. Examples of the metal alloys include iron-nickel alloys, iron-cobalt alloys, iron-nickel alloy nitrides, and iron-nickel-cobalt alloy nitrides.

The organic substances which may constitute the coating layers are not particularly limited, and either the same organic substance as that constituting the cores or a different organic substance may be used. However, resins are preferred. Examples of the resins include cellulose, cellulose acetate, polyamides, epoxy resins, polyesters, melamine resins, polyurethane resins, vinyl resins, silicone resins, and polymers or copolymers of acrylic esters, methacrylic esters, styrene, ethylene, propylene, and derivatives thereof.

Although various materials can be used to constitute the coating layers, a suitable combination of materials should be selected according to applications while taking account of the refractive index of each coating layer.

In order for the powder for use in the heat-resistant colorant composition of the present invention to be heat-resistant, both the base powder particle and the light-interference multilayered film covering the surface of the base powder particle should suffer neither deformation nor discoloration even when kept in a high-temperature state over long. In order for the base particle and the multilayered film not to suffer deformation in a high-temperature state, the resins enumerated above as examples of the organic substances should be prevented from deforming, for example, by crosslinking. Preferred is a resin which in itself is so stable as to suffer neither decomposition nor denaturation even without crosslinking. Examples of such a preferred resin include pure silicone resins, fluororesins, and silicone-modified resins.

The coefficient of thermal volume expansion of the base particle of the heat-resistant powder is about $10^{-4}/K^{-1}$, that of the heat-resistant organic coating films is about $10^{-4}/K^{-1}$ and that of the inorganic coating films is about $10^{-5}/K^{-1}$. In addition, the thermal expansion of the base particle of the powder and that of each coating layer are relative changes. Therefore, even when such a degree of dimensional change occurs, the powder colored by the formation of a light-interference multilayered film suffers no color change.

The particle diameter of the powder according to the present invention is not particularly limited, and can be suitably regulated according to purposes. However, the diameter thereof is generally in the range of 0.01 μm to several millimeters.

The unit coating layers constituting the two or more coating layers are ones whose thicknesses have been determined so that these layers have interference reflection peaks or interference transmission bottoms at the same specific wavelength. More preferably, the thickness of each unit coating layer is determined by fixing the basic film thickness thereof which satisfies the following equation (1):

$$N \times d = m \times \lambda/4 \quad (1)$$

[wherein N represents a complex refractive index; d represents a basic film thickness; m represents an integer (natural number); λ represents a wavelength at which an interference reflection peak or interference transmission peak appears; and N is defined by the following equation (2):

$$N = n + i\kappa \quad (2)$$

(wherein n represents a refractive index of each unit coating layer; i represents a complex number; and κ represents an extinction coefficient)], and correcting the actual thicknesses of the unit coating layers based on the functions consisting of the phase shift caused by the extinction coefficient κ of the refractive index, the phase shift occurring at film interfaces, and the peak shift attributable to refractive index dispersion and particle shape so that the unit coating layers have interference reflection peaks or interference transmission bottoms at the same specific wavelength as shown above.

For forming these films, the following methods may be used according to the substances to be deposited. However, other methods can be used.

(1) Formation of Organic Substance Film (Resin Film):
a. Polymerization in Liquid Phase Use can be made, for example, of a method in which particles serving as cores are dispersed and emulsion polymerization is conducted to form a resin film on each particle.
b. Film Formation in Vapor Phase (CVD) (PVD)
(2) Formation of Inorganic Metal Compound Film:
a. Solid Deposition in Liquid Phase A preferred method is to disperse particles serving as cores into a metal alkoxide solution and hydrolyze the metal alkoxide to thereby form a metal oxide film on each particle. This method can form a dense metal oxide film. It is also possible to react an aqueous solution of a metal salt to thereby form a film of a metal oxide or the like on particles.
b. Film Formation in Vapor Phase (CVD) (PVD)
(3) Formation of Metal Film or Alloy Film:
a. Reduction of Metal Salt in Liquid Phase Use is made of the so-called chemical plating method in which the metal salt contained in an aqueous metal salt solution is reduced to deposit the metal to thereby form a metal film.
b. Film Formation in Vapor Phase (CVD) (PVD)

A metal film can be formed on the surface of particles, for example, by the vapor deposition of a metal.

A method for forming a multilayered film composed of layers of a metal oxide having a high refractive index and, alternately arranged therewith, layers of a metal oxide having a low refractive index is explained below in detail as an example. First, base powder particles are dispersed into an alcohol solution of an alkoxide of titanium, zirconium, and the lie. A mixed solution consisting of water, an alcohol, and a catalyst is added dropwise to the dispersion with stirring to hydrolyze the alkoxide to thereby form on the surface of each base powder particle a film of titanium oxide or zirconium oxide as a high-refractive-index film. Thereafter, this powder is taken out by solid/liquid separation, dried, and then subjected to a heat treatment. The drying may be conducted by any means selected from vacuum drying with heating, vacuum drying, and natural drying. It is also possible to use an apparatus, such as a spray dryer or the like, in an inert atmosphere while regulating the atmosphere. The heat treatment may be accomplished by heating the powder at 150 to 1,100° C. (when the base powder particles are inorganic particles) or at 150 to 500° C. (when the base powder particles are not inorganic particles) for from 1 minute to 3 hours either in air when the film composition does not undergo oxidation or in an inert atmosphere when the film composition is susceptible to oxidation. Subsequently, the particles having the high-refractive-index film formed thereon are dispersed into an alcohol solution of a metal alkoxide which gives an oxide having a low refractive index, such as a silicon alkoxide, aluminum alkoxide, or the like. A mixed solution consisting of water, an alcohol, and a catalyst is added dropwise to the resultant dispersion with stirring to hydrolyze the alkoxide to thereby form over the surface of each base powder particle a film of silicon oxide or aluminum oxide as a low-refractive-index film. Thereafter, the powder is taken out by solid/liquid separation, vacuum-dried, and then heattreated in the same manner as the above. As a result of the above procedure, a high-refractive-index metal oxide film and a low-refractive-index metal oxide film are alternately formed on the surface of the base powder particles. By repeating this procedure for forming metal oxide films, a powder in each particle which has a multilayered metal oxide film on its surface is obtained.

The present invention will be explained below in more detail by reference to drawings. FIG. 1 is a sectional view diagrammatically illustrating the structure of a particle of a multilayer-coated powder for use in the colorant composition of the present invention. The particle comprises a base powder particle 1 as a core and, formed on the surface thereof, two coating layers 2 and two coating layers 3 differing in refractive index from the layers 2.

Coating films differing in refractive index are alternately formed on the surface of each base powder particle so as to satisfy the following equation (3). Namely, films which each is made of a substance having a refractive index n and has a thickness d corresponding to m (integer) times the value which is one-fourth a wavelength of visible light are formed in an appropriate thickness and number. As a result, the light having a specific wavelength $\lambda$ (the light utilizing Fresnel's interference reflection) is reflected or absorbed.

$$nd = m\lambda/4 \quad (3)$$

This function is utilized as follows. A film having such a thickness and refractive index as to satisfy equation (3) with respect to both a target wavelength of visible light and a target wavelength outside the visible right region is formed on the surface of each base powder particle, and this film is coated with a film having a different refractive index. This procedure is conducted once or repeated one or more times to thereby form films which have a characteristic reflection or absorption wavelength width both in the visible light region and outside a visible region. In the above procedure, the order of material deposition for film formation is determined in the following manner. When the base powder particles themselves have a high refractive index, a film having a low refractive index is preferably formed as the first layer. In the reverse case, a film having a high refractive index is preferably formed as the first layer.

Film thickness is controlled based on a measurement in which the change of optical film thickness, which is the product of the refractive index of the film and the film thickness, is determined as a reflection waveform with a spectrophotometer or the like. The thickness of each layer is designed so that the reflection waveform conforms to the finally required waveform. For example, in the case where the unit coating films constituting a multilayered film have reflection waveform peaks at different positions as shown in FIG. 2, the powder is white. In contrast, when the unit coating films are regulated so that the reflection waveform peaks thereof are in exactly the same position as shown in FIG. 3, a monochromatically colored powder, e.g., a blue, green, or yellow powder, can be obtained without using a dye or pigment. In addition, the powder has one or more specific interference reflection peaks also outside the visible light region.

However, in the case of an actual powder, a design should be made while taking account of the particle diameter and shape of the powder, the phase shift occurring at interfaces between film materials and the base particle material, the peak shift attributable to the wavelength dependence of the refractive index, etc. For example, in the case where the base particles have a plane parallel plate shape, the Fresnel interference caused by parallel films formed on a plane surface of the particle is designed under the conditions including the above equation (3) in which n has been replaced with N defined by the following equation (4). In particular, in the case where a metal film is contained, extinction coefficient $\kappa$ is included in the refractive index N of the metal defined by equation (4) even though the particle shape is a plane parallel plate shape. In the case of transparent oxides (dielectrics), $\kappa$ is exceedingly small and negligible.

$$N = n + i\kappa \text{ (i represents a complex number)} \quad (4)$$

When the extinction coefficient $\kappa$ is large, an enhanced phase shift occurs at the interface between the film material and the base particle material, and this phase shift influences the optimum interference thicknesses of all layers of the multilayered film.

Because of the above, the mere regulation of geometrical film thicknesses results in different peak positions and, hence, in a lighter color especially in monochromatic coloring. In order to avoid this, a design is made beforehand through a computer simulation so as to result in an optimal combination of film thicknesses while taking account of influences of the phase shift on all films.

Also, there are the phase shift caused by an oxide layer present on a metal surface and the peak shift attributable to the wavelength dependence of refractive index. In order to correct these, it is necessary to use a spectrophotometer or the like to find optimal conditions under which reflection peaks or absorption bottoms appear at target wavelengths in a final target number of films.

In a film formed on a curved surface such as that of a spherical particle or the like, interference occurs similarly to that on plane plates and is basically in accordance with Fresnel's interference principle. Consequently, a coloring method can be designed so as to produce a monochromatic powder as shown in FIG. 3. However, in the case of curved surfaces, the light which has struck on the powder and has been reflected causes complicated interference. The resultant interference waveforms are almost the same as on plane plates when the number of films is small. However, as the total number of films increases, the interference within the multilayered film becomes more complicated. In the case of a multilayered film also, a spectral reflection curve can be designed beforehand based on Fresnel interference through a computer simulation so as to result in an optimal combination of film thicknesses. In particular, in the case where coating films are formed on the surface of a base powder particle, the influences of a phase shift on the base powder particle surface and on all films are taken in account when a design is made beforehand through a computer simulation so as to result in an optimal combination of film thicknesses. Furthermore, the peak shift caused by a coating layer present on the base powder particle surface and the peak shift attributable to the wavelength dependence of the refractive index are also taken in account. In the actual production of a sample, designed spectral curves are referred to and, in order to correct these in actual films, it is necessary to use a spectrophotometer or the like, while changing film thicknesses, to find optimal conditions under which reflection peaks or absorption bottoms appear at target wavelengths in a final target number of films. Also in the case where a powder having irregular particle shapes is colored, interference occurs due to the multilayered film. A basic film design is hence made with reference to conditions for an interference multilayered film for spherical particles. The peak position for each of the unit coating films constituting the multilayered film can be regulated by changing the thickness of the layer, and the film thickness can be regulated by changing the solution composition, reaction time, and the number of starting-material addition times. Thus, the powder can be colored in a desired tint. As described above, a monochromatic powder can be obtained by finding optimal conditions under which reflection peaks or absorption bottoms appear at target wavelengths in a final target number of films, while changing film-forming conditions, such as solutions for film formation and the like. Furthermore, by controlling a combination of materials for forming a multilayered film and the thicknesses of the unit coating films, the color development by interference in the multilayered film can be regulated. Thus, a powder can be colored in a desired bright tint without using a dye or pigment.

A method for preparing a colorant composition (ink/coating composition) of the present invention using the thus-obtained powder according to the present invention will be explained next.

A dispersion medium for inks which is usable in the present invention is a conventionally known varnish for use in color printing or magnetic color printing. For example, a liquid polymer, a polymer or monomer dissolved in an organic solvent (referred to also as "solvent"), or the like can be suitably selected and used according to the kind of the powder, the method of applying the ink, and the use thereof.

Examples of the liquid polymer include dienes, such as polypentadiene, polybutadiene, and the like, polyethylene glycols, polyamides, polypropylenes, waxes, and copolymers, and modifications thereof.

Examples of the polymer to be dissolved in an organic solvent include olefin polymers, acrylic resins, such as oligoester acrylates and the like, polyesters, polyamides, polyisocyanates, amino resins, xylene resins, ketone resins, diene resins, rosin-modified phenolic resins, diene rubbers, chloroprene resins, waxes, and modifications, and copolymers thereof.

Examples of the monomer to be dissolved in an organic solvent include styrene, ethylene, butadiene, and propylene.

A heat-resistant colorant composition of the present invention is prepared by mixing the powder which has been colored by forming a light-interference multilayered film composed of two or more layers differing in refractive index on a base powder particle with a heat-resistant resin, a solvent, a drying accelerator, and the like.

Examples of the heat-resistant resin for use in the heat-resistant colorant composition of the present invention include pure silicone resins and fluororesins, and further include resins obtained by modifying resins for general coating materials, such as alkyd resins, epoxy resins, urethane resins, acrylic resins, melamine resins, and the like, with a silicone to impart heat resistance thereto.

The solvent for use in the colorant composition of the present invention can be a solvent for general coating materials, and is not particularly limited. Examples of the solvent generally used for coating materials include hydrocarbon solvents, such as benzene, toluene, xylene, n-hexane, cyclohexane, benzine, kerosine, and the like, alcoholic solvents, such as methanol, ethanol, isopropanol, butanol, and the like, ketone solvents, such as acetone, MEK, methyl isobutyl ketone, and the like, and ester solvents, such as methyl acetate, ethyl acetate, butyl acetate, and the like.

Examples of the drying accelerator include lead octylate, silane coupling agents, and titanium coupling agents.

Besides the above ingredients, the colorant composition of the present invention can further contain other ingredients, such as an oil-soluble dye as a coloring agent or toning agent, a thickening agent for increasing viscosity, a fluidizing agent for reducing viscosity, a dispersant for dispersing particles, and the like.

The colorant composition of the present invention, which employs a single powder or a combination of two or more powders differing in spectral characteristics, is accordingly applicable to color printing or magnetic color printing. In addition, when powders of the three primary colors are employed, the colorant composition is applicable to holography by a method based on the two-light-flux interference method, such as those described in JP-A-60-156004 and JP-A-2-72319. Furthermore, the colorant composition is applicable to other applications, such as a magnetic color ink for forgery prevention and the like, in which reflection in the infrared wavelength region or ultraviolet wavelength region is detected.

In the case where the above-described colorant composition of the present invention is printed or applied on a substrate or a body to be coated, the relationship between the contents of the powder and the dispersion medium in the colorant composition is such that the ratio therebetween is 1:0.5 to 1:15 by volume. If the content of the dispersion medium is too low, the film deposited does not tenaciously adhere to the body to be coated. If it is too high, the coating material is unsatisfactory in that its color is too light.

The relationship between the sum of the powder and the dispersion medium and the amount of the solvent in the colorant composition is such that the ratio therebetween is 1:0.5 to 1:10 by volume. If the amount of the solvent is too small, the coating material has too high a viscosity to be evenly applied. If the solvent amount is too large, much time is required for the coating film to dry, resulting in a considerably reduced coating efficiency.

The color density of a coating film formed by applying the colorant to a body to be coated is determined by the amount of the colored powder deposited per unit area of the body to be coated. A satisfactory coating color is obtained when the amount of the multilayer-coated powder of the present invention deposited on the body to be coated is 10 to 150 g in terms of areal density per square meter in the coating material after drying. If the areal density thereof is below the above values, the color of the body to be coated is visible. Areal densities thereof exceeding the above values are uneconomical because the color density of the coating does not change any more. Namely, even when the powder is deposited in a thickness larger than a given value on the body to be coated, light does not reach powder particles located on the lower side of the coating film. Forming a coating film in a thickness larger than such a value is uneconomical since it does not enhance the effect of coating because that thickness exceeds the hiding power of the coating material. However, this does not apply in the case where the coating material is applied thickly while taking account of the decrease in coating film thickness caused by wearing.

BEST MODES FOR CARRYING OUT THE INVENTION

Figure 1:
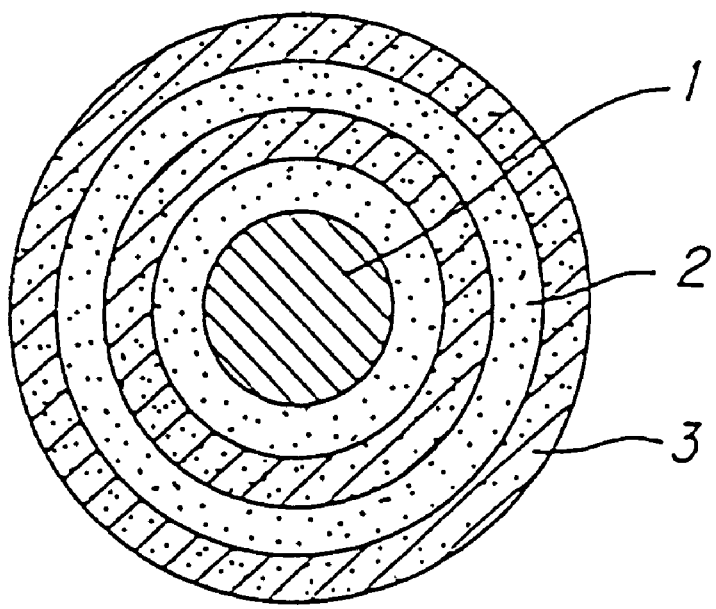
FIG. 1 is a sectional view diagrammatically illustrating the structure of a particle of a multilayer-coated powder for use in the colorant composition of the present invention; numeral 1 donates a base powder particle and numerals 2 and 3 each denotes a coating layer.
Figure 2:
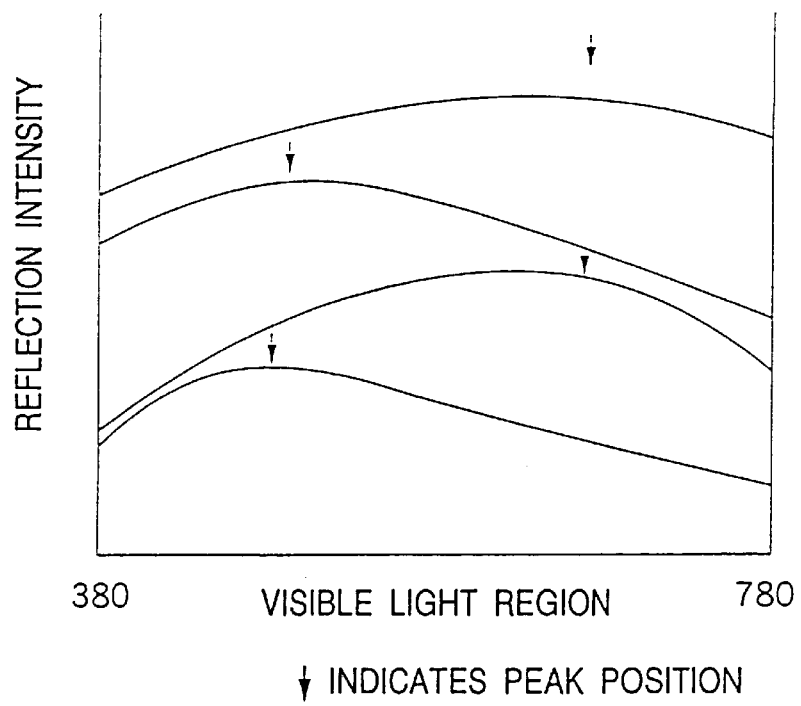
FIG. 2 is a graphic presentation showing reflection intensity spectral waveforms for the unit coating films constituting the multilayered film of a powder colored in white.
Figure 3:
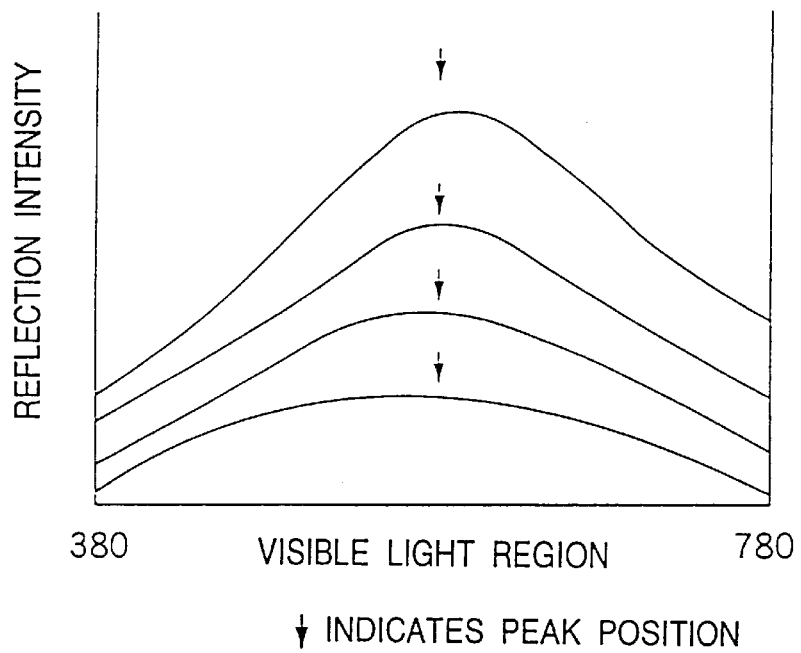
FIG. 3 is a graphic presentation showing reflection intensity spectral waveforms for the unit coating films constituting the multilayered film of a powder colored monochromatically.

The present invention will be explained below in more detail by reference to Examples. However, the invention should not be construed as being limited to these Examples only.

Example 1
Colorant Composition 1 Employing Magnetic Material
First Layer: Silica Coating Into 100 ml of ethanol was dispersed 10 g of a carbonyl iron powder (average particle diameter, 1.8 μm; magnetization at 10 kOe, 203 emu/g) manufactured by BASF. The container was heated with an oil bath to keep the temperature of the liquid at 55° C. Thereto were added 6 g of silicon ethoxide, 8 g of ammonia water (29%), and 8 g of water. This mixture was reacted for 2 hours with stirring. After the reaction, the reaction mixture was diluted and washed with ethanol and filtered. The solid matter was dried in a vacuum dryer at 110° C. for 3 hours. After the drying, the resultant powder was heated with a rotary tubular oven at 650° C. for 30 minutes to obtain a silica-coated powder $A_1$. The film thickness of the silica coating film obtained was 98 nm. This powder was excellent in dispersed state.

Second Layer: Titania Coating

After the heating, 10 g of the silica-coated powder $A_1$ obtained was redispersed into 200 ml of ethanol. The container was heated with an oil bath to keep the temperature of the liquid at 55° C. Thereto was added 4.7 g of titanium ethoxide. This mixture was stirred. A solution prepared by mixing 30 ml of ethanol with 8.0 g of water was added dropwise to the above mixture over 60 minutes, and the resultant mixture was reacted for 2 hours. The particles were then vacuum-dried and heated to obtain a titania/silica-coated powder $A_2$. The titania/silica-coated powder $A_2$ obtained had satisfactory dispersibility and was composed of independent particles. The titania film of this titania/silica-coated powder $A_2$ had a thickness of 77 nm.

This powder had a spectral reflection curve having a peak wavelength of 410 nm and had a reflectance at the peak wavelength of 35%. It was bright-green.

This powder had a magnetization of 167 emu/g at 10 kOe.

With respect to each coating film of the above coated powder, the peak wavelength for a spectral reflection curve, the reflectance at the peak wavelength, and the refractive index and thickness of the coating film were measured by the following methods.

(1) The spectral reflection curve was obtained by a method in which a spectrophotometer having an integrating sphere and manufactured by Nippon Bunko was used to examined light reflected by a powder sample packed in a glass holder. The examination was made in accordance with JIS Z8722 (1988) and JIS Z8723 (1988).

(2) The refractive index and the film thickness were determined and evaluated by examining samples produced under different conditions and having large film thicknesses to obtain spectral reflection curves and comparing the examination results, for fitting, with Curves obtained through instrumental calculation based on the interference equation.

Third Layer: Silica Coating

Into 100 ml of ethanol was dispersed 10 g of the titania/silica-coated powder $A_2$. The container was heated with an oil bath to keep the temperature of the liquid at 55° C. Thereto were added 6 g of silicon ethoxide, 8 g of ammonia water (29%), and 8 g of water. This mixture was reacted for 2 hours with stirring. After the reaction, the reaction mixture was diluted and washed with ethanol and filtered. The solid matter was dried in a vacuum dryer at 110° C. for 3 hours. After the drying, the resultant powder was heated with a rotary tubular oven at 650° C. for 30 minutes to obtain a silica/titania-coated powder $A_3$. The film thickness of the silica/titania-coated powder $A_3$ obtained was 99 nm. This powder was excellent in dispersed state.

Fourth Layer: Titania Coating

After the heating, 10 g of the silica/titania-coated powder $A_3$ obtained was redispersed into 200 ml of ethanol. The container was heated with an oil bath to keep the temperature of the liquid at 55° C. Thereto was added 5.3 g of titanium ethoxide. This mixture was stirred. A solution prepared by mixing 30 ml of ethanol with 8.0 g of water was added dropwise to the above mixture over 60 minutes, and the resultant mixture was reacted for 2 hours. The particles were then vacuum-dried and heated to obtain a titania/silica-coated powder $A_4$. The titania/silica-coated powder $A_4$ obtained had satisfactory dispersibility and was composed of independent particles. The titania film of this titania/silica-coated powder $A_4$ had a thickness of 75 nm.

This powder had a reflection peak at 553 nm and a reflectance of 47%. It was bright-green.

This powder had a magnetization of 146 emu/g at 10 kOe.
Preparation of Colorant Composition and Spectral Characteristics The powder thus obtained was mixed in an amount of 65 parts with 35 parts of a polyester resin varnish.

The resultant composition was applied to a white paper with a blade coater.

The coated paper in the visible light region had a reflection peak at 553 nm with a reflectance of 53%. Outside the visible light region, the coated paper had a reflection peak at 303 nm in the ultraviolet region with a reflectance of 94%, and further had reflection peaks at 1,310 nm and 980 nm in the infrared region with reflectances of 95% and 61%, respectively.

Comparative Example 1
Mere Mixture of Magnetic Material and Pigment

Viridian (green pigment) (average particle diameter, 0.1 μm; reflection peak, 553 nm; reflectance, 49%) was mixed with a carbonyl iron powder (average particle diameter, 1.8 μm; magnetization at 10 kOe, 203 emu/g) manufactured by BASF, in a weight ratio of 25 g/25 g, and further with 25 g of titanium oxide (rutile; average particle diameter, 0.2 μm) as a vehicle. This mixture was sufficiently homogenized. This powder mixture had a magnetization of 67 emu/g in a magnetic field of 10 kOe.

As in the above, 65 parts of the mixed powder was mixed with 35 parts of a polyester resin varnish, and the resultant composition was applied to a white paper with a blade coater.

The paper coated with this ink had a reflection peak at 557 nm, at which the reflectance was as low as 18%.

The mere mixing of a pigment with a magnetic powder, a resin, and a solvent as in Comparative Example 1 does not result in an improved color. In order to obtain a magnetic color ink having the same magnetization, it is necessary to positively color a magnetic material as in the Example.

Example 2
Colorant Composition 2 Employing Magnetic Material
First Layer: Silica Coating Into an ethanol solution prepared beforehand by dissolving 3.0 g of silicon ethoxide in 158.6 g of ethanol was dispersed 20 g of a carbonyl iron powder (average particle diameter, 1.8 μm; magnetization at 10 kOe, 203 emu/g) manufactured by BASF. Thereafter, a solution prepared beforehand by mixing 8.0 g of ammonia water with 8.0 g of deionized water was added to the dispersion with stirring. After the addition, the resultant mixture was reacted at ordinary temperature for 5 hours. The particles were washed with a sufficient amount of ethanol, subsequently vacuum-dried, and then heated with a rotary tubular oven at 500° C. for 30 minutes in a nitrogen atmosphere to obtain a silica-coated carbonyl iron powder $B_1$.

Second Layer: Titania Coating

Into an ethanol solution prepared beforehand by dissolving 3.0 g of titanium ethoxide in 198.3 g of ethanol was dispersed 20 g of the silica-coated carbonyl iron powder $B_1$. Thereafter, a solution prepared beforehand by mixing 3.0 g of deionized water with 23.7 g of ethanol was added dropwise to the dispersion with stirring over 1 hour. After the addition, the resultant mixture was reacted at ordinary temperature for 5 hours. The particles were washed with a sufficient amount of ethanol, subsequently vacuum-dried, and then heated with a rotary tubular oven at 500° C. for 30 minutes in a nitrogen atmosphere to obtain a titania/silica-coated carbonyl iron powder $B_2$.

Third Layer: Silica Coating

Into an ethanol solution prepared beforehand by dissolving 3.0 g of silicon ethoxide in 158.6 g of ethanol was dispersed 20 g of the titania/silica-coated carbonyl iron powder $B_2$. Thereafter, a solution prepared beforehand by mixing 8.0 g of ammonia water with 8.0 g of deionized water was added to the dispersion with stirring. After the addition, the resultant mixture was reacted at ordinary temperature for 5 hours. The particles were washed with a sufficient amount of ethanol, subsequently vacuum-dried, and then heated with a rotary tubular oven at 500° C. for 30 minutes in a nitrogen atmosphere to obtain a silica/titania-coated carbonyl iron powder $B_3$.

Fourth Layer: Titania Coating

Into an ethanol solution prepared beforehand by dissolving 3.0 g of titanium ethoxide in 198.3 g of ethanol was dispersed 20 g of the silica/titania-coated carbonyl iron powder $B_3$. Thereafter, a solution prepared beforehand by mixing 3.0 g of deionized water with 23.7 g of ethanol was added dropwise to the dispersion with stirring over 1 hour. After the addition, the resultant mixture was reacted at ordinary temperature for 5 hours. The particles were washed with a sufficient amount of ethanol, subsequently vacuum-dried, and then heated with a rotary tubular oven at 500° C. for 30 minutes in a nitrogen atmosphere to obtain a titania/silica-coated carbonyl iron powder $B_4$.

Fifth Layer: Silica Coating

Into an ethanol solution prepared beforehand by dissolving 3.0 g of silicon ethoxide in 158.6 g of ethanol was dispersed 20 g of the titania/silica-coated carbonyl iron powder $B_4$. Thereafter, a solution prepared beforehand by mixing 8.0 g of ammonia water with 8.0 g of deionized water was added to the dispersion with stirring. After the addition, the resultant mixture was reacted at ordinary temperature for 5 hours. The particles were washed with a sufficient amount of ethanol, subsequently vacuum-dried, and then heated with a rotary tubular oven at 500° C. for 30 minutes in a nitrogen atmosphere to obtain a silica/titania-coated carbonyl iron powder $B_5$.

Sixth Layer: Titania Coating

Into an ethanol solution prepared beforehand by dissolving 3.0 g of titanium ethoxide in 198.3 g of ethanol was dispersed 20 g of the silica/titania-coated carbonyl iron powder $B_5$. Thereafter, a solution prepared beforehand by mixing 3.0 g of deionized water with 23.7 g of ethanol was added dropwise to the dispersion with stirring over 1 hour. After the addition, the resultant mixture was reacted at ordinary temperature for 5 hours. The particles were washed with a sufficient amount of ethanol, subsequently vacuum-dried, and then heated with a rotary tubular oven at 500° C. for 30 minutes in a nitrogen atmosphere to obtain a titania/silica-coated carbonyl iron powder $B_6$.

The thickness and refractive index of each layer of the thus-obtained multilayered film on the powder are shown in Table 1 below.

TABLE 1

| Film Name | Film thickness (nm) | Refractive index |
| --- | --- | --- |
| First layer, silica film | 50 | 1.5 |
| Second layer, titania film | 37.5 | 2.0 |
| Third layer, silica film | 50 | 1.5 |
| Fourth layer, titania film | 37.5 | 2.0 |
| Fifth layer, silica film | 50 | 1.5 |
| Sixth layer, titania film | 37.5 | 2.0 |

Preparation of Colorant Composition and Spectral Characteristics

Two grams of this titania/silica-coated carbonyl iron powder $B_6$ was mixed with 10 g of a polyester resin varnish and 7 g of xylene as a solvent to prepare an ink. An A4 art paper was evenly coated with 5 g of the ink with a blade coater and then dried.

Figure 4:
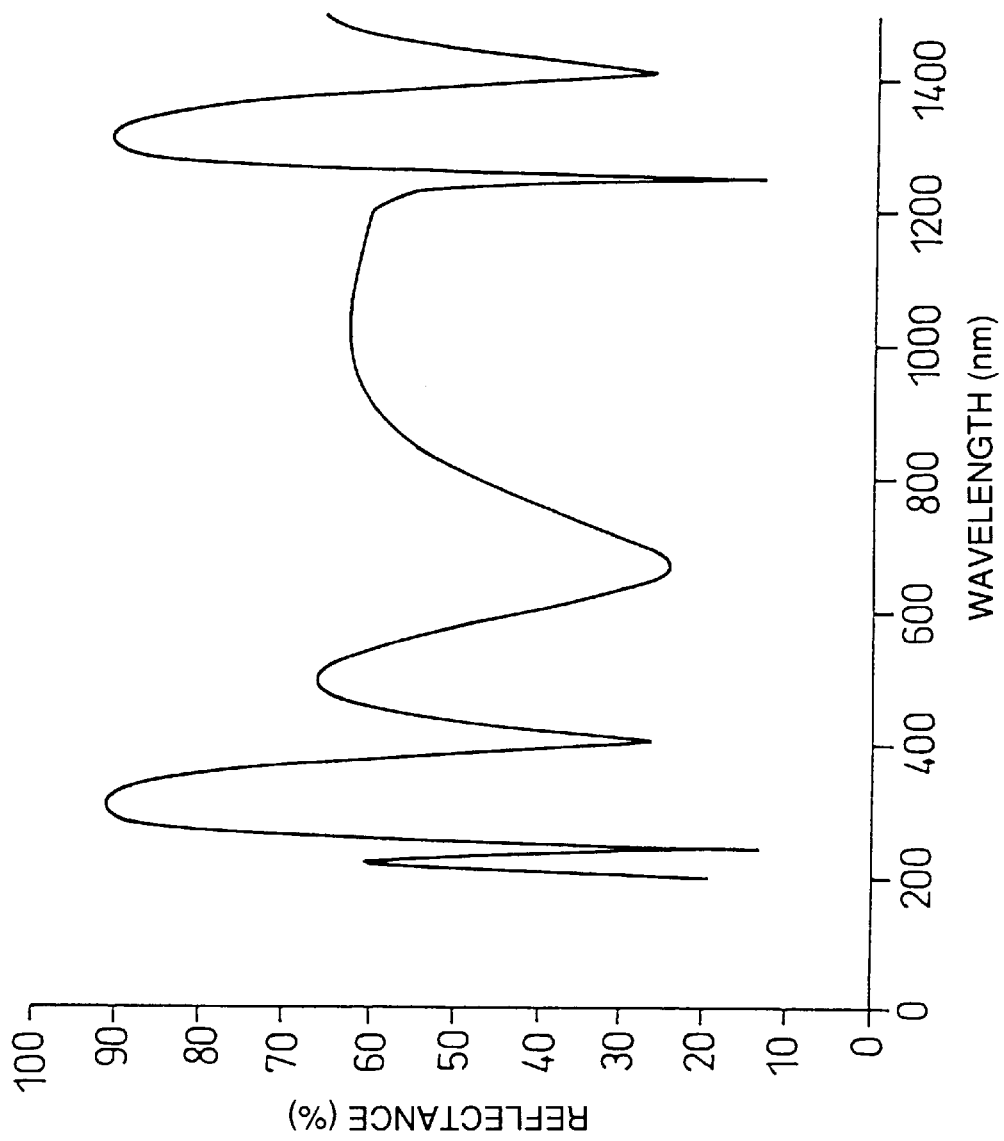
FIG. 4 is a graphic presentation showing a spectral reflectance curve of the colorant composition obtained in Example 2.

The coated paper obtained after drying had the spectral reflectance curve shown in FIG. 4. This coated paper was bright-blue, with a reflectance at 460 nm of 64%.

The coated paper reflected 93% of a light around 315 nm in the ultraviolet region and reflected 93% of a light around 1,115 nm in the infrared region. By detecting the two lights for discrimination, it is possible to judge genuineness by four means, i.e., magnetism, a visible light color, ultraviolet rays, and infrared rays.

Example 3

Process for Producing Purplish-red Multilayer-coated Powder

First Layer: Silica Coating

Into 100 ml of ethanol was dispersed 10 g of a magnetite powder (average particle diameter, 1.2 μm). Thereto were added 6 g of a silicon ethoxide, 8 g of 29% ammonia water, and 8 g of deionized water. The resultant mixture was reacted for 5 hours with stirring. After the reaction, the reaction mixture was diluted with ethanol and filtered. The particles were dried with a vacuum dryer at 110° C. for 8 hours. After the drying, the particles were heated with a rotary tubular oven at 650° C. for 30 minutes in a nitrogen atmosphere to obtain a silica-coated powder $C_1$. The film thickness of the silica-coated powder $C_1$ obtained was 75 nm. This powder was excellent in dispersed state. This silica-coated powder $C_1$ was heated.

Second Layer: Titania/silica Coating

To 10 g of the silica-coated powder $C_1$ obtained was added 200 ml of ethanol to disperse the particles. Thereto was added 3.5 g of titanium ethoxide. This mixture was stirred. A solution prepared by mixing 30 ml of ethanol with 3.5 g of water was added dropwise to the above mixture over 60 minutes, and the resultant mixture was reacted for 5 hours. Vacuum drying and heating were conducted in the same manners as for the first layer. Thus, a silica/titania-coated powder $C_2$ was obtained. The silica/titania-coated powder $C_2$ obtained had satisfactory dispersibility and was composed of independent particles.

The titania film of this silica/titania-coated powder $C_2$ had a thickness of 55 nm.

Third Layer: Silica Coating

Ten grams of the silica/titania-coated powder $C_2$ was dispersed into 100 ml of ethanol. Thereto were added 6 g of silicon ethoxide, 11 g of 29% ammonia water, and 8 g of water. The resultant mixture was reacted for 5 hours with stirring. After the reaction, the reaction mixture was diluted and washed with ethanol and filtered. The particles were dried for 8 hours in the same manner as for the first layer. After the drying, the particles were heated with a rotary tubular oven at 650° C. for 30 minutes to obtain a silica-coated powder $C_3$.

The film thickness of the silica-coated powder $C_3$ obtained was 78 nm. This powder was excellent in dispersed state.

Fourth Layer: Titania/silica Coating

To 10 g of the silica-coated powder $C_3$ obtained was added 200 ml of ethanol to disperse the particles. Thereto was added 3.8 g of titanium ethoxide. This mixture was stirred. A solution prepared by mixing 30 ml of ethanol with 3.8 g of water was added dropwise to the above mixture over 60 minutes, and the resultant mixture was reacted for 5 hours. Vacuum drying and heating were conducted in the same manners as for the first layer. Thus, a silica/titania-coated powder $C_4$ was obtained. The silica/titania-coated powder $C_4$ obtained had satisfactory dispersibility and was composed of independent particles.

This silica/titania-coated powder $C_4$ had satisfactory dispersibility and was composed of independent particles. The titania film as the fourth layer had a thickness of 57 nm.

Properties of the Coated Powder

The multilayer-coated powder thus obtained had reflection peaks at 380 nm and 780 nm with reflectances of 40% and 45%, respectively. It had a bright purplish-red color. This powder had a magnetization of 69 emu/g at 10 kOe.

Preparation of Heat-resistant Coating Material

To 50 parts by weight of a pure silicone resin was added 30 parts by weight of the purplish-red, multilayer-coated powder obtained above, followed by 50 parts by weight of benzene. The resultant mixture was kneaded and homogenized to obtain a coating composition.

The coating composition obtained was applied to an alumina ceramic plate. The composition applied was dried to obtain a coating film having a thickness of 12 μm. The coated plate was purplish-red. This coated plate was examined with a spectrophotometer to determine absorption wavelengths. As a result, the peak wavelength was 770 nm and the reflectance was 48%.

Furthermore, this coated plate was held in an oxygen atmosphere at 500° C. for 200 hours, subsequently cooled, and then examined with a spectrophotometer for absorption wavelengths. As a result, the peak wavelength was 768 nm and the reflectance was 49%, which were almost the same.

Industrial Applicability

According to the present invention, a colorant composition of a clear and stable color tone, such as, blue, green, yellow, or the like, can be obtained without using a dye or pigment.

Furthermore, since the composition has one or more interference reflection peaks also outside the visible light region, forgery prevention with an even higher degree of certainty is possible, besides visual recognition and magnetic printing, when the composition is used in combination with a reader for detecting reflected ultraviolet or infrared rays.

Moreover, powders having various properties, such as ferroelectric materials, conductive materials, and the like, can be utilizable. Even in the case of a magnetic material, it can be colored in a clear tint without impairing the magnetic properties.

In addition, by applying this colorant composition, a coating film is obtained which suffers neither discoloration nor color fading even at a high temperature of 350° C. to 600° C.

In particular, the powder used in the present invention comprises a base powder particle made of any of various materials suffering neither deformation nor discoloration at a high temperature of 350° C. to 600° C. and a light-interference multilayered film formed on the particle, and thus has a color different from that of the base powder particle and unchangeable thermally. Therefore, the powder gives a heat-resistant coating composition which suffers no color change at a high temperature and is capable of readily forming a heat-resistant coating film.

What is claimed is:

1. A colorant composition comprising at least a powder dispersed in a dispersion medium, said powder comprising a base particle coated with a multilayered film comprising layers differing from each other in refractive index and having a color due to light interference among the layers constituting the multilayered film, said powder having an interference reflection peak in the visible light region and an interference reflection peak outside the visible light region, wherein the thickness of each layer satisfies the following equation (1):

$$N \times d = m \times \lambda / 4 \qquad (1)$$

wherein N represents a complex refractive index; d represents a basic film thickness; m represents an integer (natural number); λ represents a wavelength at which an interference reflection peak or interference transmission peak appears; and N is defined by the following equation (2):

$$N = n + i\kappa \qquad (2)$$

wherein n represents a refractive index of each unit coating layer; i represents a complex number; and κ represents an extinction coefficient, the actual thicknesses of the unit coating layers being corrected to account for phase shift caused by the extinction coefficient κ of the refractive index, the phase shift occurring at film interfaces, and the peak shift attributable to refractive index dispersion and particle shape so that the unit coating layers have interference reflection peaks or interference transmission bottoms at the same specific wavelength.

2. The colorant composition according to claim 1, wherein the base particle of the powder is a magnetic material.

3. The colorant composition according to claim 1, wherein the base particle of the powder is a dielectric material.

4. The colorant composition according to claim 1, wherein the base particle of the powder is a conductive material.

5. The colorant composition according to claim 1, wherein the base particle of the powder is made of a material which suffers neither deformation nor discoloration at a high temperature of 350° C. to 600° C.

6. The colorant composition according to claim 1, wherein at least one layer of the multilayered film of the powder is a metal compound layer.

7. The colorant composition according to claim 1, wherein at least one layer of the multilayered film of the powder is a metal layer or an alloy layer.

8. The colorant composition according to claim 1, wherein the dispersion medium comprises at least one resin and a solvent.

9. The colorant composition according to claim 8, wherein the resin is at least one heat-resistant resin.

10. The colorant composition according to claim 9, wherein the heat-resistant resin is at least one selected from a pure silicone resin, a fluororesin, and a silicone-modified resin.

11. A color ink composition comprising the colorant composition according to claim 1.

12. A heat-resistant colorant composition comprising the colorant composition according to claim 1.

13. The colorant composition according to claim 1, wherein the powder is a spherical powder.

* * * * *